United States Patent [19]
Murray

[11] Patent Number: 4,812,858
[45] Date of Patent: Mar. 14, 1989

[54] INDEXING MECHANISM

[75] Inventor: Richard A. Murray, San Diego, Calif.

[73] Assignee: Enter Computer, Inc., San Diego, Calif.

[21] Appl. No.: 134,011

[22] Filed: Dec. 17, 1987

[51] Int. Cl.⁴ .......................... G01D 9/30; G01D 15/24
[52] U.S. Cl. .................................. 346/139 R; 346/46; 346/49; 346/141
[58] Field of Search ............... 346/46, 49, 139 R, 141; 364/520; 74/84 R, 436

[56] References Cited

U.S. PATENT DOCUMENTS

| | | | |
|---|---|---|---|
| 2,778,710 | 1/1957 | Komas | 346/139 R |
| 3,070,736 | 12/1962 | Polley | 74/436 |
| 3,831,458 | 8/1974 | Takanashi | 74/436 |
| 4,405,931 | 9/1983 | Fujisawa | 346/139 R |
| 4,517,576 | 5/1985 | Sugawara | 346/139 R |
| 4,518,972 | 5/1985 | Gunderson et al. | 346/139 R |
| 4,660,054 | 4/1987 | Kajikawa et al. | 346/139 R |
| 4,716,420 | 12/1987 | Glassett | 346/139 R |
| 4,754,288 | 6/1988 | Lawrence | 346/46 |

Primary Examiner—E. A. Goldberg
Assistant Examiner—Mark Reinhart
Attorney, Agent, or Firm—Knobbe, Martens, Olson & Bear

[57] ABSTRACT

The present invention comprises a mechanism for incrementally rotating a plotter carousel holding a plurality of pens around its perimeter. The rotational increments of the carousel are spaced to present any of the plurality of pens to a drawing arm on the plotter, or other graphics. A non-servo, non-stepper electric motor, such as a DC motor commonly used in slot cars, provides the rotational power to rotate the carousel. A control device switches the motor on or off with an output connected to the base of a driver connected between the power supply and the motor. The motor, when on, rotates an incremental indexing mechanism that in turn rotates the carousel in increments, each increment being a fraction of one full rotation. A switch is provided which detects that the carousel has been rotated one increment. This switch is connected to the control device, and, depending upon whether or not the desired pen is at the transfer point, the control device accordingly either switches off the motor or advances the carousel to the desired increment. Thus, the present invention uses event feedback to control the carousel. The event that the carousel has rotated one increment is this feedback.

13 Claims, 3 Drawing Sheets

INDEXING MECHANISM

BACKGROUND OF THE INVENTION

1. Field of the Invention.

The present invention relates to plotting mechanisms with the capability of selecting any of a plurality of pens mounted on a rotating carousel. More specifically, the invention relates to a computer controlled mechanism for indexing the pen carousel so that the desired pen is rotated to a reference position where the pen can be transferred to or from the drawing arm.

2. The Prior Art.

In the present era of automation, numerous devices are being developed that will accurately, efficiently, and quickly perform tasks that just a few years ago were performed manually. A large portion of the reason for automation is the rapid development of computers from the early room-sized devices to the present desk top personal computer. Microprocessor controlled devices such as the personal computer have greatly expanded capabilities for efficiently and accurately processing large amounts of data or other information. However, simply processing the data is not enough; the degree to which a computer is able to effectively convey data and other results of its processing to the user is a key measure of its utility to the user.

In recent years, graphical output has become an increasingly popular and commonly used form of output. For example, with presently available software, such as SPICE, an engineer can simulate complex electrical circuits without ever building them. Rather than presenting the results of such a simulation in a large table of numbers, it is much more desireable to present the output of the simulation in graphical form, such as a plot of output voltage vs. input voltage. This graphical output can be either sent to the screen of the CRT for viewing by the user, or to a plotting mechanism which makes a "hard-copy" of the graph on paper.

As another example of a plotting mechanism, Hewlett-Packard has developed a plotter than can be directly connected to a circuit in the same manner as an engineer would connect an oscilloscope. Thus a trained operator can easily obtain an accurate "hard-copy" of all the information viewable on a oscilloscope, including circuit characteristics such as voltage vs. time or output voltage vs. input voltage.

Plotter mechanisms can also be useful in the business world to provide graphical output such as stock trends against time, or to compare trends in various money markets against time. The output possibilities for plotter mechanisms are limited only by the size of the paper that can be inserted into the particular device. Many existing plotters allow the user to color various portions of his plot with a particular color of his choice. For example, an engineer may wish to compare several functional characteristics on same graph, and for that purpose he may select green for one characteristic, blue for another, and black for another. As another example a stock analyst may find it useful to have separate market trends appear in different colors. For example, the NYSE volume may appear in red, and the Tokyo Stock Exchange volume in blue. This capability for color selection is an important commercial element of virtually all plotters on the market today.

The mechanism for color selection typically includes a rotatable circular carousel having a plurality of pens affixed along its perimeter, each pen being a different color and also being removable from its position on the perimeter. Thus, when a certain pen is to be used for coloring a portion of the plot, a control device, often including a microprocessor, rotates the carousel until the chosen pen is at a transfer point where it can be grasped by a drawing arm. Then the chosen pen may be manipulated by the drawing arm under control of the plotter mechanism in order to draw the graph or other figure on paper or any other writing surface.

A key element of this color selection mechanism is the component for rotating the chosen pen until it is aligned with the transfer point. This component (or another) must also maintain the carousel in this aligned transfer position while the drawing arm latches onto the pen and removes it for drawing, and again it must maintain the carousel in the transfer position until the pen is deposited back into place on the carousel after the drawing arm has completed drawing with the chosen pen.

Components for rotating the carousel and positioning it at the aligned transfer position have taken various forms. Principally, precision devices such as stepper or servo motors have been used to both rotate the carousel and to align it with the transfer point.

A stepper motor has several windings at specific locations surrounding the rotor, each winding being switchable separately to independently connect each winding with a voltage source. A particular position of the rotor can be chosen by switching each winding either on or off. Thus, the number of switchable connections (drivers) must correspond to the number of separate windings. In order to move or rotate the stepper motor, a particular combination of switches are actuated, which applies a voltage to the associated combination of windings.

A servo motor most simply may be defined as an electric motor capable of providing feedback as to the position of the rotor, or one of its derivatives such as velocity. This feedback information is typically used to control the position of the rotor. In operation, a motor is rotated by application of a voltage while a control system monitors the feedback. When the control system determines that the rotor is in the desired position an appropriate signal is sent by the control device to stop motor rotation.

Either a servo motor and a stepper motor can be used to accurately position a carousel in a plotter mechanism. Using either type of motor, it is the position of the rotor that is used as feedback to control carousel rotation. The connection between the servo or stepper motor and the carousel maybe one of at least two types: (1) a direct connection, (2) a geared connection. In the direct connection, in each instance, it is a known position of the motor rotor that corresponds directly to the position of the carousel. In other words, the position of the motor rotor directly controls the position of the carousel. For example, if a carousel has six pens spaced equally around the perimeter of the carousel, each pen being numbered from one to six, and if pen 1 is that pen present at the transfer point, then to move pen 2 to the transfer point corresponds to a 1/6 rotation of the carousel and the stepper or servo motor.

Another type of connection between the servo or stepper motor and the carousel is the geared connection. In the geared arrangement, the output rotor of the motor turns a carousel through a series of gears of known ratio so that each increment of carousel rotation is associated with a known number of rotor rotations. If a servo motor is used in a geared arrangement, the feedback from the servo is monitored by the control device as the rotor turns. After a certain predetermined number of rotor rotations has occurred, the control device stops the motor.

Various factors influence reliability and cost of any electrical circuit or mechanical device. A simple circuit or device that utilizes few components and has fewer connections will in general be less expensive to produce and more reliable than a more complex circuit or device that performs the same function. Thus complexity of a circuit, including its connections and number of components, is a factor affecting cost and reliability. Furthermore, the extent of programming of a control device that is necessary to perform the desired objective influences the eventual cost and reliability of a product. Generally, a system with fewer types of inputs and outputs is easier to control than one with more numerous inputs and outputs. Thus, the variety of inputs and outputs affects the extent of programming necessary to accomplish a given objective.

As noted previously, to control a stepper motor, each winding must be switchable through an independent driver. If for example, a stepper motor has four windings, then the control circuit must be connected to four independent driver connections connected to the respective windings on the stepper motor, thereby affecting complexity of the circuit and the number of components therein. Furthermore, the control device may comprise substantial programming to, for example, generate the sequence to rotate a stepper motor three times.

Also, the servo motor may have a complicated connection between itself and the digital control circuit. If, for example, the servo motor provides analog feedback (i.e a variable voltage dependent upon position), then the analog feedback must be processed into a digital form before it can be used by the digital portion of the control device. This processing is performed by an A/D (analog/digital) converter which converts the voltage level to digital form (i.e. a series of ones and zeroes). Of course, the accuracy of the A/D converter is dependent upon the number of bits it can output. For example four bits of output can distinguish sixteen separate voltage values, each of which must have a separate connection with a digital portion of the control circuit. A quantization error is the amount by which the actual analog voltage may vary from digitally value. To reduce quantization error, an even larger number of bits must be provided as an output for the A/D converter, and there is a correspondingly greater cost and also a larger number of connections with the digital portion of the control device.

Some servo motors can directly provide a digital output indicative of position. For example, one commercially available servo motor provides a quadrature output of two bits indicative of the position of the rotor, the two bits providing a binary output of either 00, 01, 10, or 11, each of which indicates one of four positions of the rotor.

After a digital output has been provided to the control device, a digital state machine may be utilized to decode the output. This output may then be applied in a series of microprocessor-controlled operations to apply the position data to perform the desired objective. Furthermore a counter must be provided to count the number of rotor turns which must be compared with the predetermined number of turns in order to rotate the carousel to present the desired pen to the drawing arm. Thus, the processing of digital feedback from the servo motor includes decoding and counting, and therefore adds another layer of complexity to the programming of a digital portion of the control device. In addition, the servo motor requires use of a special component, a bidirectional driver in order to operate properly. A bidirectional driver is used because it is necessary to reverse polarity to the DC motor when the servo feedback is used to maintain the rotor in one position.

By nature, the stepper motor has certain disadvantages when compared with other DC motors. One disadvantage is that the stepper is less efficient than its DC counterpart. In other words, for a given amount of speed, a stepper motor dissipates more power and generates more heat. The hardware is also affected by this factor; each of the drivers must be of a high-power type in order to pass the larger amount of power necessary to operate the stepper motor.

A servo motor may incorporate a DC motor; however, the additional feedback circuitry adds another level of complexity to the motor. By adding a critical component to a DC motor, the servo motor becomes a precision device, thereby substantially increasing cost over that of a standard DC motor and also reducing reliability.

Finally, it must be noticed that both (stepper motors and servo motors) inherently are precision motor devices which must be manufactured under rigid standards in order to provide a reasonable degree of accuracy and reliability. When installed in a plotter mechanisms, both types of motors must be precisely positioned within the mechanism and precisely connected to the carousel.

Once physically installed, their numerous connections must be made with the respective components, such as drivers and the control device. Lastly, the digital portion of the control device must be programmed to accommodate the respective inputs and provide the outputs.

Thus, it would be an improvement in the art to provide a mechanism for rotating a carousel and for maintaining it in an aligned position which uses a low cost alternative to a stepper or a servo motor. It would be a further improvement in the art to provide such a mechanism that does not utilize feedback of rotor position to control the carousel rotation, and which has a simple input to the control device and is controlled by a simple output from the control device.

BRIEF SUMMARY OF THE INVENTION

The present invention overcomes the disadvantages of prior art mechanisms for rotating a carousel and maintaining it in position. The present invention provides an indexing mechanism which can be operated with a low cost, low power dissipation DC motor, and which can be controlled with one bit of input and one bit of output, thereby filling a need for an easily controlled low cost mechanism that quickly and reliably rotates a carousel from one incremental position to the next, and maintains it in any one of a number of incremental of positions.

The present invention comprises a mechanism for incrementally rotating a carousel on a plotter or other graphics device, the carousel holding a plurality of pens around its perimeter, the increments of rotation being spaced to present any of the plurality of pens to a drawing arm on a plotter or drawing device. A non-servo, non-stepper electric motor, such as a DC motor commonly used in slot cars, provides the rotational power to rotate the carousel. A control device switches the motor on or off with an output connected to the base of a transistor driver connected between the power supply and the motor. The motor, when on, rotates an incremental indexing mechanism that in turn rotates the carousel in increments, each increment being a fraction of one full rotation. A switch is provided which detects that the carousel has been rotated one increment. This switch is connected to the control device, and, depending upon whether or not the desired pen is at the transfer point, the control device accordingly either switches off the motor or advances the carousel to the desired increment. Thus, the present invention uses event feedback to control the carousel. The event that the carousel has rotated one increment is this feedback.

A geneva indexing mechanism is provided for translating a rotation of the DC motor into a rotation of the carousel in increments. The geneva indexing mechanism comprises a geneva arm and a geneva sprocket, the sprocket being connected to the carousel. The geneva arm is connected to the DC motor by a series of gears by which the DC motor can rotate the geneva arm. With one full rotation of the geneva arm, the geneva sprocket is rotated one incremental position, and is prevented from moving from that position. The switch detects a defined position of the geneva arm where it has rotated the carousel by one increment. At this defined position, the arm and the sprocket are engaged in a manner such that further rotation of the geneva arm of less than one half of a complete 360 degree rotation does not change the position of the geneva indexer. Thus, after the switch has communicated to the controller the fact that the geneva arm has completed an increment, the controller may shut off the motor and the geneva arm may glide to a stop beyond the switch, with no effect on the position of the carousel.

These and other advantages and features of the present invention will become more fully apparent from the following description and appended claims taken in conjunction with the accompanying drawings.

DETAILED DESCRIPTION OF THE PREFERRED EMBODIMENT

Figure 1:
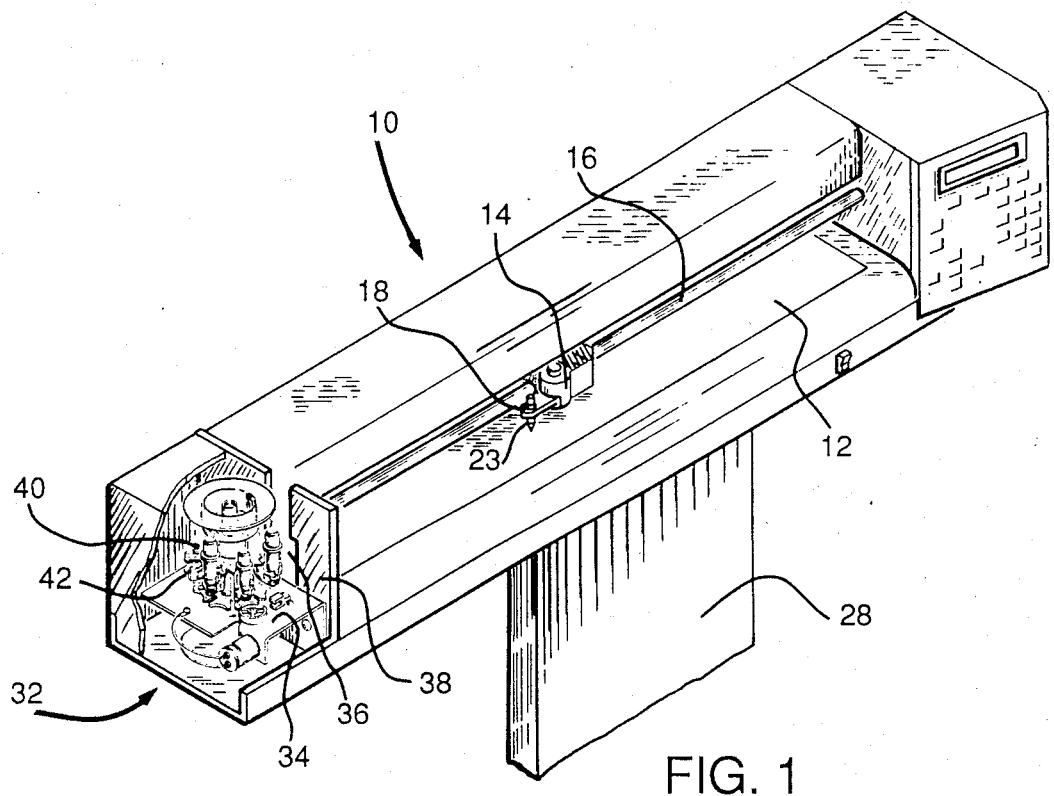
FIG. 1 is a perspective view of a plotter mechanism.

The present invention may be incorporated into any of a plurality of plotter mechanisms that provide the capability for choosing from any of a plurality of colored pens, and then drawing with that pen. Many such plotters are commercially available, such as the Hewlett Packard Model HP 7580, the Houston Instruments DMP-51MP series, and the CalComp 1040 series.

These and other plotters comprise a drawing arm which first chooses the colored pen from a plurality of pens provided on a rotating carousel. The chosen pen is rotated to a transfer point where it is transferred to a pen claw having opposed fingers for holding the pen. The pen claw is attached to a drawing arm, which first moves the pen to the desired starting point, then moves it into contact with paper or another drawing surface. Virtually any image can be drawn by such a computer-controlled mechanism by directing a series of movements of the drawing arm or the paper, or simultaneously controlling simultaneous movements of both the drawing arm and the paper. When the plotter has completed drawing with one color, the drawing arm returns the pen to its place in the carousel. If desired, a new pen is chosen and the above-described drawing process is continued with this next chosen pen.

The invention is best understood by reference to the figures wherein like parts are designated with like numerals throughout.

Figure 2A:
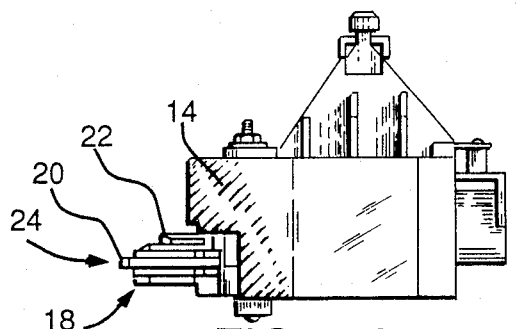
FIG. 2A and 2B are elevation views of a drawing arm, FIG. 2A showing the pen claw in the upward lifted position and FIG. 2B showing the pen claw in the downward writing position.
Figure 2B:
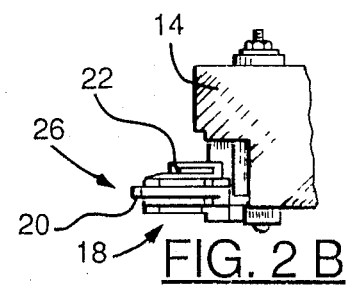

FIG. 1 illustrates, in perspective, an exemplary plotter mechanism 10 incorporating the preferred embodiment of the present invention. This plotter mechanism 10 comprises a drawing surface 12, and a drawing arm 14 slidable on a drawing arm slide bar 16. In FIG. 2A and FIG. 2B the drawing arm 14 is shown in more detail. The drawing arm 14 includes a pen claw 18 having two opposing fingers including a first finger 20 and a second finger 22 for gripping a drawing pen 23. It can be seen that the pen claw 18 is moveable with respect to the drawing arm 14 to and from an upward lifted position 24 shown in FIG. 2A to a downward writing position 26 shown in FIG. 2B. In the upward lifted position 24 shown in FIG. 2A, a pen 23 is not in contact with the drawing surface 12 shown in FIG. 1, and thus, the drawing arm 14 may slide across the slide bar 16 to move to any starting position over the drawing surface 12 without marking the drawing surface 12 with the pen 23. Referring again to FIG. 1, with the pen 23 in the downward writing position 26, the pen 23 is forced into contact with a writing material (not shown), such as paper, provided over the drawing surface 12. The drawing arm 14 and pen claw 18 are more fully disclosed in an application Ser. No. 134,032 entitled "Method and Apparatus for Detecting the Presence or Absence of a Pen in a Pen Recorder" filed of even date herewith by Richard A. Murray, John White, and George Kirk Branner. The specification and drawings of which are incorporated by reference herewith.

The plotter mechanism 10 shown in FIG. 1 is also provided with a stabilizing stand 28 upon which it may rest, and is also connected to a power supply such as 110 Volt 60 Hz A.C. (not shown). Furthermore, the plotter mechanism 10 is connected to a control device (not shown in FIG. 1), part or all of which may be incorporated into the body of the plotter mechanism 10. The control device comprises programming to direct the plotting process which includes producing a series of commands to either move the drawing arm 14 along the slide bar, to move the paper, or to move both the drawing arm 14 and the paper to create the desired curve on the paper. Such control devices are well known in the art.

Referring again to FIG. 1, a carousel rotation assembly 32 is provided on a base plate 34 affixed to a side wall 38 of the plotter mechanism 10. The purpose of this carousel rotation assembly 32 is to present any of a plurality of pens 23 at a transfer position 36, where the presented pen 23 can be grasped by the pen claw 18, or conversely, where the pen claw 18 can return the pen 23 currently in its grasp. An annular carousel 40 is provided with a plurality of pen holders 42 spaced about its perimeter.

Figure 5:
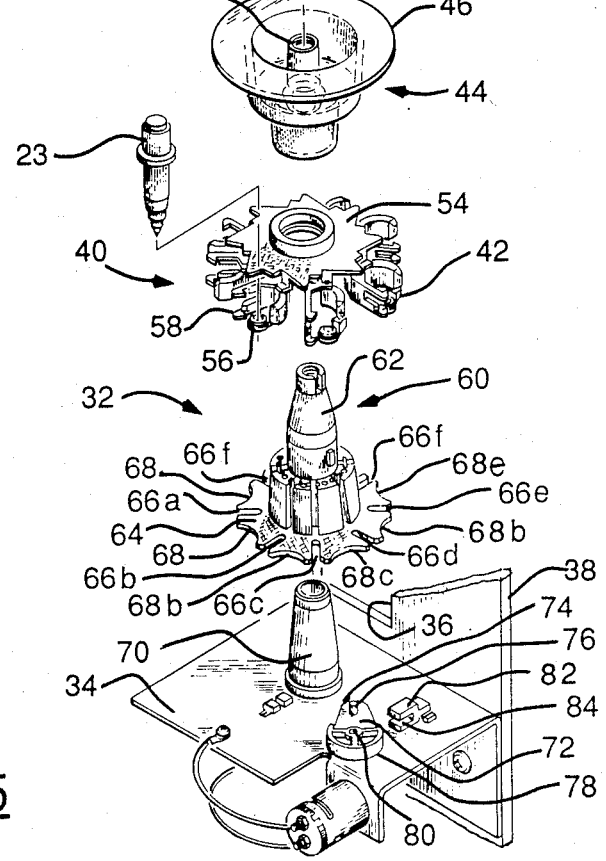
FIG. 5 is an exploded view of the carousel rotation assembly including the carousel, the geneva sprocket, the pens, and the spindle upon which the carousel rests.
Figure 6:
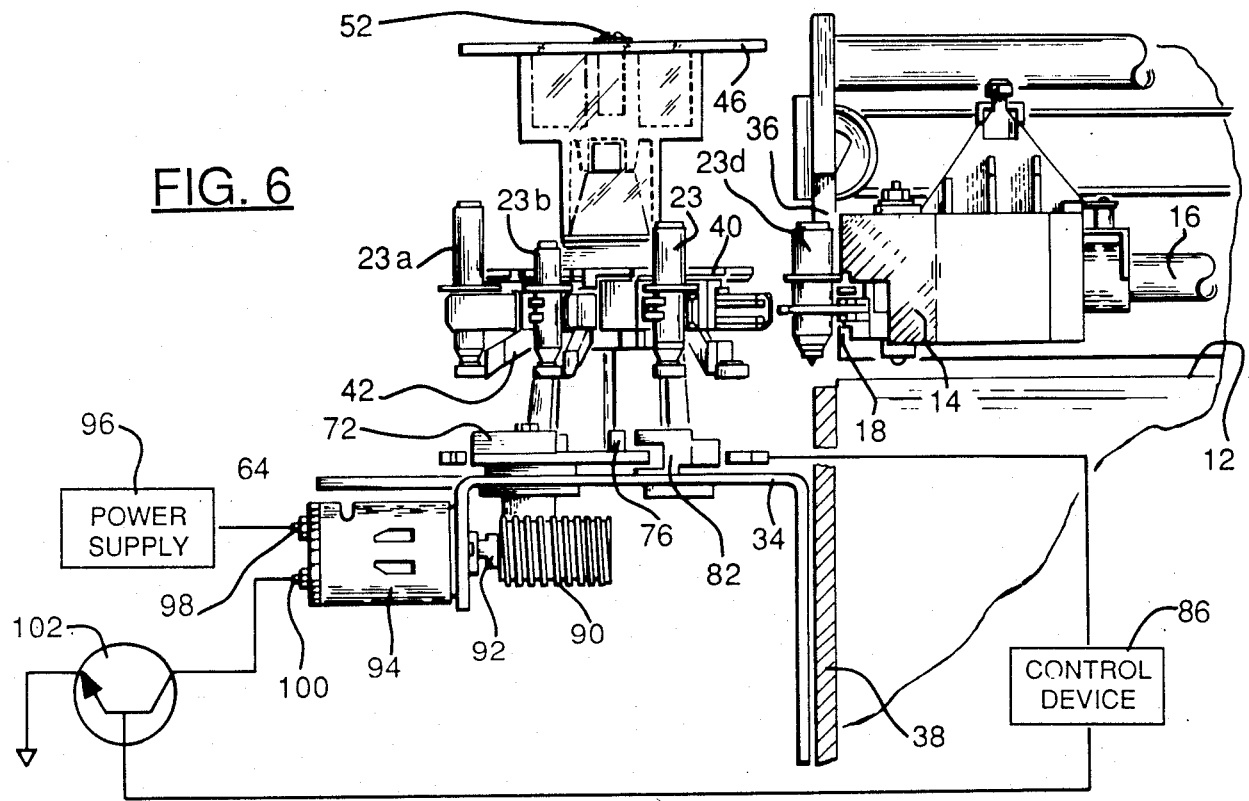
FIG. 6 is an elevation view of the carousel rotation assembly with a partial cross section of the side wall, showing the drawing arm holding the pen at a transfer position where the pen may be transferred to and from the carousel.

FIG. 5 illustrates an exemplary carousel 40 in exploded form. The carousel 40 comprises an upper cap 44 having a circular flange 46 for facilitating removal and insertion of the carousel 40, and further comprises a partially conical, partially cylindrical axial bore (not shown), and a screw hole 50 formed therein for receiving a carousel screw 52. The carousel 40 further comprises a star disc 54 and a plurality of pen holders 42 each having a lever arm 56, an anti-claw 58, and a spring (not shown) for providing a force tending to bring each anti-claw 58 towards its associated lever arm 56. The lever arm 56 and the anti-claw 58 are constructed of a shape to securely grasp a pen 23 between them, and the spring provides a force to hold a pen 23 in position between the lever arm 56 and the anti-claw 58. The pen claw 18 is adapted to insert or remove a pen 23 from each pen holder 42. Alternatively a pen 23 may be inserted or removed manually by hand. The carousel 40 further comprises a base 60 having a conical upper portion 62 for engaging with the star disc 54 and the axial bore of the upper cap 44. The base 60 includes a geneva sprocket 64 formed integrally thereon or affixed thereto. The geneva sprocket 64 includes a plurality of radial slots 66a-g, each slot 66a-g being separated on the perimeter by a partial cylindrical recess 68a-g. In other words, the outer perimeter of the geneva sprocket 64 comprises a plurality of recesses 68a-g and a plurality of slots 66a-g. The base 60 further includes a conical axial bore (not shown) having a shape to mate with a conical spindle 70 affixed to the base plate 34, so that in the engaged position held in place by gravity, the carousel 40 is freely rotatable about the axially placed spindle 70.

A geneva arm 72 is connected to the base plate 34 proximate the outer radius of the geneva sprocket 64 when the sprocket is in position engaged with the spindle 70. The geneva arm 72 comprises a post end 74, a cylindrical post 76 extending upward therefrom, and a curved end 78. As is well known, the post 76 is engageable within each radial slot 66, and the curved end 78 having a partial cylindrical surface complementing the recesses 68 of the geneva sprocket 64.

The geneva arm 72 is connected to a geneva axle 80 extending through a hole (not shown) in the base plate 34, so that the geneva arm 72 is rotatable about the axle 80. A detector, such as an optical detector 82 having a detection slot 84, is provided on the base plate 34. The optical detector 82 is positioned on the base plate 34 in a position so as to be actuable by the geneva arm 72 when a portion of the post end 74 passes through the detection slot 84.

Figure 3:
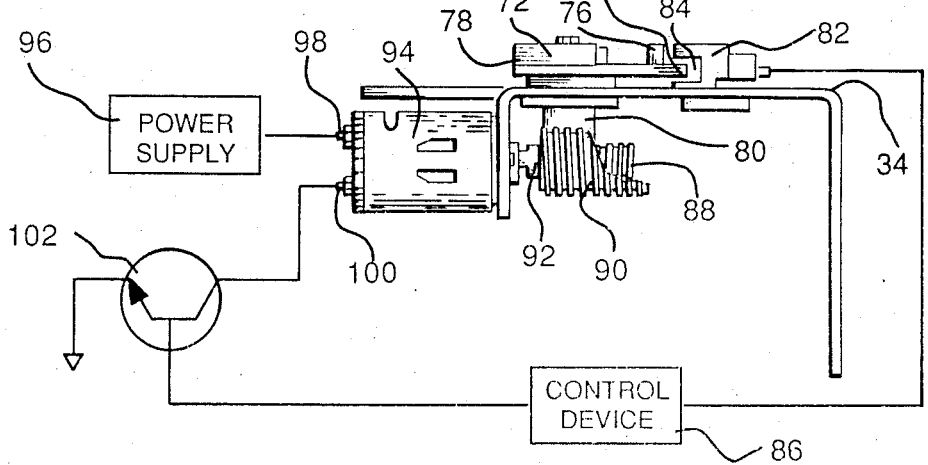
FIG. 3 is a side view of a spur gear, a worm gear partially cut away to show the spur gear, a geneva arm, and a geneva axle, showing their relationship with a base plate and an optical switch and control device, and further showing the connection between the control device (shown in block), a transistor switch, a power supply (shown in block), a motor, and the worm gear and the spur gear in the preferred embodiment of the present invention.

FIG. 3 illustrates the post end 74 of the geneva arm 72 engaged within the detection slot 84. A control device 86 (shown in block) that comprises a microprocessor in the preferred embodiment is connected to the optical detector 82, so that the control device 86 has an input indicative of whether or not the post end 74 is engaged with the optical detector 82.

Again referring to FIG. 3, on the end of the geneva axle 80 distant from the geneva arm 72, the geneva axle 80 is connected to a spur gear 88 which engages a worm gear 90 connected axially with a motor shaft 92. In the preferred embodiment, this motor shaft 92 is the rotating shaft of a DC motor 94 which has a rotor (not shown) comprising a plurality of windings, rotating around the motor shaft 92. A power supply 96 is connected to a first terminal 98 of the DC motor 94, and a second terminal 100 of the DC motor 94 is connected to the collector of a transistor 102. The emitter of the transistor 102 is connected to a ground or other reference voltage. The control device 86 (shown in block) has a digital output connected to the base of the transistor 102 so that the transistor 102 is non-conducting when the output is digital low, and conducting when the output is digital high. As a result, a digital high on the output of the control device 86 actuates the motor 94, rotating the motor shaft 92 and the worm gear 90 affixed axially thereto. The spur gear 88 rotates by its engagement with worm gear 90, but at a slower rate of rotation determined by the gear ratio between it and the worm gear 90.

Preferable parts for the elements disclosed in FIG. 3 include a plastic 48 pitch worm gear 90 manufactured by Stock Drive Products, N.Y., and a matching spur gear 88. The transistor is preferably a 2N2222 driver transistor. The DC motor 94 is preferably a 13-volt model commonly used for slot car racers, a model HC 355 manufactured by Johnson Electric North America and the power supply 96 may be any compatible 13 volt DC power supply. It will be recognized by those skilled in the art that other parts may be effectively utilized. For example, any part that closes a switch in response to a digital signal may be substituted for the transistor 102. Also, other motors 94 and voltage supplies, of various voltages may also be effectively utilized. Also, a different ratio for the spur gear 88 to the worm gear 90 may be used.

With reference again to FIG. 3, it should be noted that the positioning of the optical detector 82 is such that the post end 74 (having the furthest extension from the geneva axle 80) will pass through the detection slot 84 in at least one rotational position of the geneva arm 72. The optical detector 82 has an output connected to the control device 86, indicating a unique position of the geneva arm 72 within its rotation. The control device 86 may be incorporated within the control device for the plotter, as in the preferred embodiment, or it may be a separate device.

Figure 4A:
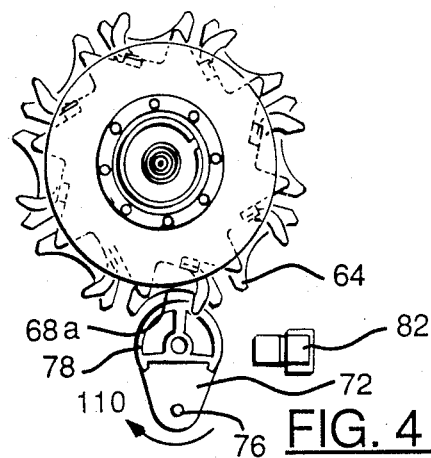
FIGS. 4 a–d illustrate the relationship of the geneva sprocket and the geneva arm as the geneva arm rotates about its axis.
Figure 4B:
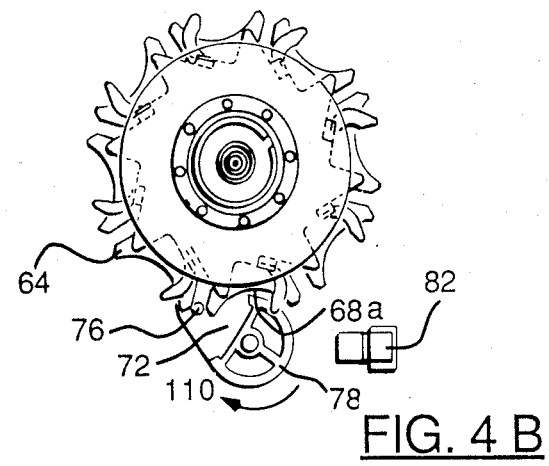
Figure 4C:
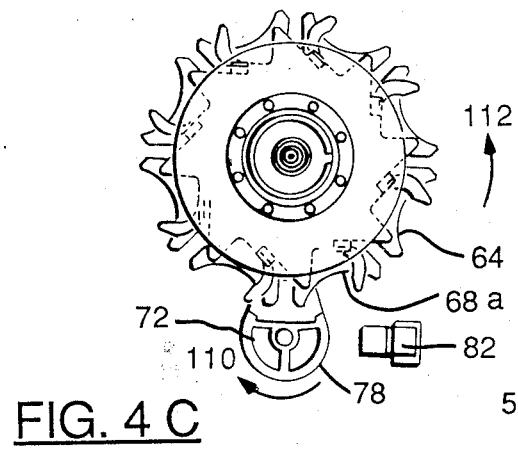
Figure 4D:
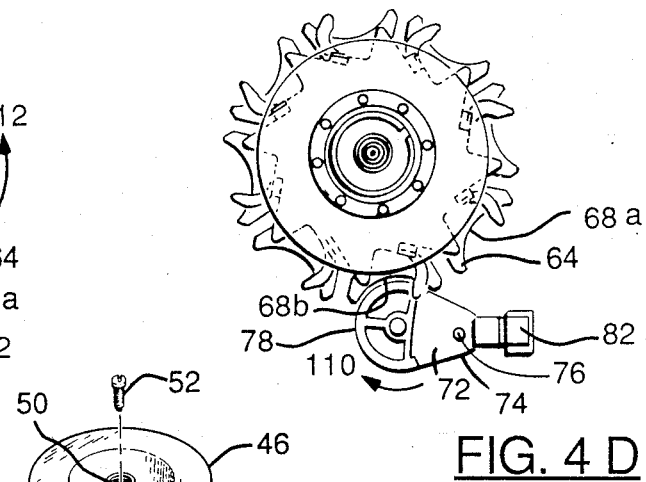

FIGS. 4A-4D show the geneva arm 72 and geneva sprocket 64 in a sequential series of positions. Beginning with the geneva arm 72 in the position shown in FIG. 4A, it can be seen that the curved convex end 78 of the geneva arm 72 is engaged with a concave curve 68a on the perimeter of the geneva sprocket 64 preventing movement of the geneva sprocket 64 and the carousel 40 connected thereto. As the geneva arm 72 begins rotating in the clockwise direction, as shown by arrow 110 in FIG. 4A, the curved convex end 78 of the geneva arm 72 slides along the concave curve 68a, but the geneva sprocket 64 remains fixed in position. As rotation of the geneva arm 72 continues to the position shown in FIG. 4B, the post 76 enters a slot 66a on the sprocket 64 and pushes the sprocket 64 in a rotational direction illustrated by arrow 112 in FIG. 4C. As rotation of the geneva arm 72 continues past the configuration shown in FIG. 4C, the post 76 exits the slot 66 and the convex curve end 78 of the geneva arm 72 contacts another concave curve 68b on the sprocket 64 to prevent further rotation of the sprocket 64. FIG. 4D illustrates the configuration wherein the post end 74 has exited the slot 66a and is engaged within the detection slot 84 of the optical detector 82. As shown in connection with the discussion of FIG. 3, the optical detector 82, upon sensing the post end 74 within the detection slot 84, outputs a signal to the control device 86 to indicate that the sprocket 64 has been rotated by one increment.

As will be discussed in connection with FIG. 7 and FIG. 8, the control device 86, upon receiving this signal from the optical detector 82, will command either a continued application of the power supply 96 to the motor 94 or will turn off the power supply 96 and thereby turn off the motor 94. If the motor 94 is turned off, the geneva arm 72 will continue rotation and eventually coast to a stop. To assure proper positioning of the sprocket 64, it is required only that the coast, or overrun of the geneva arm 72 be less than that required to remove the cylindrical surface 78 of the geneva arm from contact with the cylindrical recess 68. This coating, or overrun is substantially caused by rotational inertia of the motor 94, the spur gear 88, the geneva axle 80, and the geneva arm 72.

In a preferred embodiment, the motor 94 may rotate the worm gear 90 by any number of complete revolutions from zero to twenty after the stop command, without changing the position of the sprocket 64. Inherent frictional forces acting upon the drive mechanism including the motor, the rotor shaft, the worm gear, the spur gear, the geneva axle and the geneva arm are sufficient to stop the rotor within twenty revolutions. It is this feature which greatly simplifies the control system.

The geneva mechanism comprising the geneva arm 72 and the geneva sprocket 64 is one type of a more general class of mechanisms termed "lost-motion mechanisms." A lost motion mechanism may be defined as one that does work, or actuates or controls another device during only a portion of its periodic range of movement. The remaining portion of its range of movement does not actuate another device, and this is "lost."

Figures 7, 8:
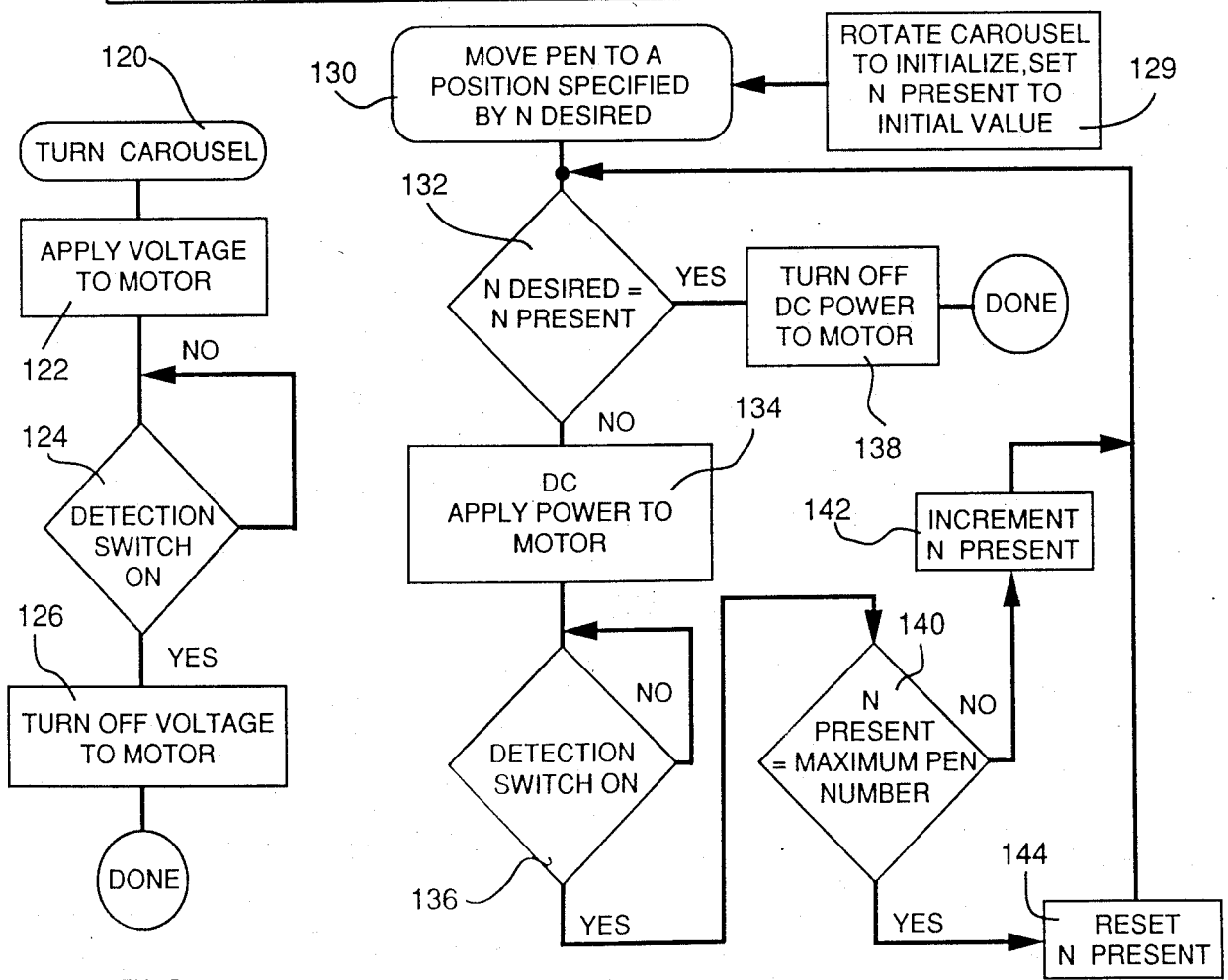
FIG. 7 is a flow chart illustrating the logic used by the control device in the preferred embodiment of the present invention.
FIG. 8 is a flow chart illustrating the logic used by the control device in an alternate embodiment of the present invention.

Referring now to FIG. 7 a flow chart illustrates a series of operations of the preferred embodiment of the control device 86 to control incremental rotation of the sprocket 64. A command statement 120 is first generated to turn the carousel 40 by one increment. This command 120 may, for example, be generated by a programmed digital device in a sequence that directs a pen 23 change in order to color a particular curve on a graph, or as another example, this command 120 may be generated directly by the user. Upon receiving the command 120 to turn the carousel 40, the control device 86 applies the power supply 96 to the motor 94 as illustrated in operation box 122 by, for example, applying a digital "high" output to the base of the transistor 102. The motor 94 then rotates in response to the applied voltage, rotating the geneva arm 72 through one incremental rotation of the geneva sprocket 64 as illustrated in FIGS. 4A–4D. When the detection switch is actuated, as illustrated in decision box 124, as for example when the post end 74 actuates the optical detector 82, then the control device 68 turns off the voltage to the motor 94, as illustrated in the operation box 126, by, for example by applying a digital "low" value to the base of the transistor 102. Following the box 126, operation of the flow chart of FIG. 7 is "done," i.e., the carousel has been rotated by one increment. To move another increment, the process is simply repeated by generating another command signal 120 to turn the carousel 40. Thus, to move the carousel 40 any specified number of increments, the command signal 120 is applied the specified number of times. For example, to move the pen 23 by three increments, a turn command 120 is generated three times in sequence.

An alternate embodiment of the control device 86 comprises a series of operations illustrated in FIG. 8. In this embodiment, a command 130 is generated to move a pen 23 to a position specified by a parameter Ndesired. The pen holders 42 on the carousel 40 are usually numbered sequentially around the perimeter beginning at one and continuing up to the number of pens 23. For example, the pen holders may be numbered 1–8. Accordingly, the parameter Ndesired specifies a pen 23 by specifying a particular pen holder number to be moved to the transfer position 36. Another parameter, Npresent specifies the specific pen holder 42 at the transfer position 36.

Npresent may be determined in any of a variety of well known methods. In one method, a mechanical or optical switch is provided which detects a tab extending from a known location on the carousel 40 which corresponds to the number of a certain pen holder 42 at the transfer position 36, for example, number one. When the plotter 10 is first turned on, the carousel 40 is rotated until the switch detects the tab, thus identifying the number of the pen holder 42 at the transfer point 36. In the above example, when the plotter mechanism 10 is first turned on, the carousel 40 is rotated until the switch detects the tab. It is then known that Npresent=1, and from this reference, Npresent is continually updated by incrementing Npresent each time the optical detector 82 detects the post end 74 of the geneva arm 72. This method may also be used by a control device 86 performing the series of operations shown in FIG. 7, so that the control device 86 has stored within it a continually updated number corresponding to Npresent, so that the control device 86 can determine the number of increments needed to present the desired pen 23 at the transfer position 36.

In operation, after initializing Npresent in a box 129, and after the command 130 is generated to move the carousel 40 to a specified position Ndesired, decision box 132 shows that the specified position is compared with Npresent. If they are not equal, the control device 86 then moves to the operation box 134 and applies the power supply 96 to the motor 94, by for example, applying a digital "high" to the base of the transistor 102. In response, the motor 94 rotates the geneva indexing mechanism as illustrated in FIGS. 4A-4D. With power being continually applied to the motor 94, the control device 86 then moves to the decision box 136, where it awaits a signal from the optical detector 82 to indicate that the carousel 40 has rotated by one increment. In order to maintain the proper count in Npresent, when the control device 86 receives the signal indicating that the detection switch is on, operation of the control device 86 moves to a box 140 where Npresent is compared with the maximum number of pens. If not equal, then Npresent is less than the maximum pen number, and operation moves to a box 142 where Npresent is incremented. If however, they are equal, then Npresent is reset to the first pen number, for example, "one". From the boxes 142, 144, operation of the control device moves to the box 132 where Ndesired is again compared with Npresent and if they are not equal, then application of the power supply 96 to the motor 94 is continued until the optical detection switch 82 again indicates that the geneva mechanism has rotated one increment. The process continues until the carousel 40 has rotated to the desired position (Ndesired=Npresent) after which power to the motor 94 is turned off as illustrated in an operation box 138. Operation is then complete.

For example, if Ndesired=5 and Npresent=3, then the command to move the pen 23 initiates a sequence wherein first Ndesired=5 is compared with Npresent=3. Because they are not equal, the power supply 86 is applied to the motor 94. When the optical detection switch 82 goes "on", Npresent becomes 4, and Ndesired (=5) is again compared with Npresent. Because they are still not equal, application of the power supply 96 to the motor 94 is continued. When the optical detection switch 82 goes "on" again, Npresent becomes 5. Ndesired (=5) is now compared with Npresent, and because they are equal, the power supply 96 to the motor 94 is turned off, and the operation is now complete, so that the desired pen 23 can now be transferred to the pen claw 18, or vice versa.

Alternative embodiments of the present invention may comprise components varying from those described above. For example, the present invention may be embodied in other types of plotter mechanisms employing a carousel 40. Other alternative embodiments may comprise, for example, a reversible DC motor, instead of a one way DC motor 94, or as another example, a mechanically actuated switch may be substituted for the optical switch 82 described herein.

Referring to an alternative embodiment incorporating a reversible DC motor, an advantage is provided in that the carousel 40 may be rotated in either direction. Given the number of the pen holder 42 presently at the transfer position 36, and the number of the pen holder 42 desired to be moved to that same transfer position 36, the control device 86 as is well known may calculate the minimum number of increments needed to move the desired pen holder 42 to the transfer position 36. Using this minimum number and the direction associated therewith, the control device 86 then can direct rotation in that direction and in that number of increments in the manner described in FIG. 7 or FIG. 8. For example, if eight pen holders 42 are on the carousel 40 and if it is desired to move from pen holder 42b to pen holder 42a, then the control device 86 may reverse the reversible DC motor and move therein one increment. In comparison, a one-way DC motor 94 would be directed to rotate seven increments. Thus, a reversible DC motor would provide a mechanism for more quickly indexing the carousel 40. In an embodiment incorporating a reversible DC motor, it is preferable to use an additional detection switch such as optical detector 82, but affixed to the base plate 34 on the opposite side of the geneva arm 72 so that it detects the post end 74 immediately after it exits from a slot 66 while operating in the reverse direction. Other embodiments may incorporate a single switch such as optical detector 82; however in these embodiments the detector 82 should be affixed to the base plate 34 in a position distant enough from the carousel 40 that the post 76 will not enter a slot 66 after the control device 86 has turned off the reversible DC motor.

Additional alternative embodiments may comprise a microswitch instead of the optical detector 82. A micro switch is a widely available type of electric switch which is mechanically actuated. Such a switch may be affixed to the base plate 34 in order to detect the presence of the post end 74 of the geneva arm 72. In this embodiment, the microswitch is connected to the control device 86. Thus, similar to the optical detector 82, the output of the microswitch may be used as illustrated in FIG. 7 and FIG. 8 in the process of incrementally indexing the carousel. An embodiment incorporating such a microswitch may be cost-effective, and may be a preferred embodiment if cost is an important factor.

What is claimed:

1. An apparatus comprising: a carousel in a plotter or other graphics mechanism, the carousel holding a plurality of pens, the carousel rotating about a carousel axle incrementally to present any of the plurality of pens to a drawing arm at a transfer position; an electric power supply; a control device;
   a motor, responsive to the control device, said motor including a rotor shaft;
   a geneva arm having a post end and a curved end;
   a geneva axle connected to the geneva arm, so that the post end and the curved end rotate about the axis of rotation of the geneva axle, said geneva axle being connected to the rotor shaft so that the geneva arm rotates in response to rotation of the rotor shaft;
   a geneva sprocket connected to the carousel, said geneva sprocket having a perimeter including a plurality of first surfaces for slidable contact with the post and a plurality of second surfaces for slidable contact with the curved surface of the geneva arm so that the carousel is maintains one of the plurality of pens at the transfer position when the geneva arm rotates while its curved surface contacts said second surface;
   a switch for detecting the presence of the geneva arm at a predetermined angle of rotation of the geneva arm about the geneva axle, said switch producing an output signal which is applied to the control device, said predetermined angle being selected so that if the drive means is switched off after detection, the rotating geneva arm will coast to a stop without substantially affecting the position of the carousel.

2. The apparatus for incrementally indexing a plotter carousel as claimed in claim 1 wherein the motor means comprises a DC electric motor an the electric power supply comprises a DC power supply.

3. The apparatus for incrementally indexing a plotter carousel as claimed in claim 1 wherein the switch comprises an optical detector having a detection slot for detecting the post end of the geneva arm.

4. The apparatus for incrementally indexing a plotter carousel as claimed in claim 1 wherein the rotor shaft is connected to a worm gear, and the geneva axle is connected to a spur gear, said spur gear meshing with said worm gear so that a rotation of the rotor shaft is translated to a rotation of the geneva arm about the geneva axle.

5. The apparatus for incrementally indexing a plotter carousel as claimed in claim 1 wherein the geneva sprocket is integrally formed with the carousel whereby the carousel and the geneva sprocket are integrally connected.

6. An apparatus comprising: a rotatable carousel in a plotter or other graphics mechanism, said carousel having a plurality of incremental angular positions; a control device;
- a motor responsive to the control device, the inertia of the rotor and rotor shaft of which causes said rotor to continue to spin after the removal of driving electric power from said motor;
- an actuator connected to said motor, said actuator being rotatable in response to said motor; one complete revolution defining a first angle wherein the carousel remains stationary and a second angle wherein the carousel if rotating;
- means for maintaining the plotter carousel at one of a plurality of incremental positions while the actuator is rotating throughout the first angle;
- means, connected to the motor, for rotating the carousel between the incremental positions while the actuator is rotating through the second angle;
- a switch positioned within the arc of the first angle, thereby providing an output signal for detecting an event that said means for rotating the carousel has completed movement of the carousel by an incremental amount, the timing of said output signal being such that the control device has sufficient time to switch off power to the motor, subsequent to which the rotor and rotor shaft can coast to a stop while the actuator remains within the bounds of the first angle.

7. The apparatus for incrementally indexing a carousel as claimed in claim 6 wherein the motor comprises a DC electric motor having a rotor for transmitting rotational power.

8. The apparatus for incrementally indexing a carousel as claimed in claim 7 further comprising a drive translation mechanism including further a worm gear connected to the rotor anad a spur gear engaging with the worm gear said spur gear being connected to the actuator.

9. The apparatus for incrementally indexing a carousel as claimed in claim 6 wherein carousel is connected to a geneva sprocket, and wherein the actuator comprises a geneva arm.

10. The apparatus for incrementally indexing a carousel as claimed in claim 9 wherein the maintaining means comprises a partial cylindrical surface on the geneva arm, and further comprises a partial cylindrical recess on the perimeter of the geneva sprocket, said surface having a curve complementing the recess.

11. The apparatus for incrementally indexing a carousel as claimed in claim 9 wherein the geneva arm has a post end, and the switch is actuable by said post end, so that said switch is actuated when the post end is at a predetermined position of rotation of the geneva arm.

12. The apparatus for incrementally indexing a plotter carousel as claimed in claim 6 wherein the detection means comprises an optical detector.

13. An apparatus comprising: a pen carousel on a plotter or other graphics mechanism;
- a motor, the inertia of the rotor and rotor shaft of which causes said rotor to continue to spin after the removal of driving electric power from said motor;
- a lost-motion mechanism connected between said rotor of said motor and said pen carousel, said lost-motion mechanism alternatively and repeatedly: (a) holding said pen carousel in a fixed position as said rotor shaft rotates, or (b) causing said pen carousel to rotate in response to rotation of said rotor shaft;
- an electronic control device connecting said motor to driving electric power to cause said motor, through said lost-motion mechanism to rotate said carousel, and disconnecting said motor from said driving electric power when said lostmostion mechanism is holding said pen carousel in a fixed position,
- said control device disconnecting said motor at a predetermined position of the lost motion mechanism to permit said rotor shaft to spin to a stop, after disconnection of said motor from said driving electric power, while said lost-motion mechanism holds said carousel in a fixed position.

* * * * *